United States Patent [19]

Kasuga et al.

[11] Patent Number: 4,537,833

[45] Date of Patent: Aug. 27, 1985

[54] MAGNETIC RECORDING MEDIUM

[75] Inventors: Akira Kasuga; Nobuyuki Yamamoto; Hajime Miyatsuka, all of Kanagawa, Japan

[73] Assignee: Fuji Photo Film Co., Ltd., Kanagawa, Japan

[21] Appl. No.: 606,097

[22] Filed: May 2, 1984

[30] Foreign Application Priority Data

May 2, 1983 [JP] Japan ................. 58-77840

[51] Int. Cl.$^3$ ............................. G11B 5/70
[52] U.S. Cl. ..................... 428/328; 252/62.54; 252/62.55; 360/134; 360/135; 360/136; 427/128; 427/132; 428/403; 428/425.9; 428/480; 428/694; 428/695; 428/900
[58] Field of Search ........... 428/694, 403, 900, 695, 428/328, 329, 336, 425.9, 480 A; 427/44, 132, 131, 128; 252/62.55, 62.54; 360/134–136; 75/0.5 A

[56] References Cited

U.S. PATENT DOCUMENTS

| | | | |
|---|---|---|---|
| 4,054,530 | 10/1977 | Deffeyes | 428/900 |
| 4,061,824 | 12/1977 | Deffeyes | 428/328 |
| 4,337,288 | 6/1982 | Takenaka | 428/900 |
| 4,352,859 | 10/1982 | Yoda | 428/522 |
| 4,391,864 | 7/1983 | Hosaka | 428/900 |
| 4,407,901 | 10/1983 | Miyatsuka | 428/407 |
| 4,431,712 | 2/1984 | Matsufuji | 428/900 |
| 4,439,486 | 3/1984 | Yamada | 428/900 |
| 4,448,848 | 5/1984 | Okita | 422/44 |
| 4,450,199 | 5/1984 | Tadokoro | 428/317.9 |
| 4,455,345 | 6/1984 | Miyatuka | 428/694 |
| 4,465,737 | 8/1984 | Miyatuka | 428/695 |
| 4,496,626 | 1/1985 | Kasuga | 427/132 |

*Primary Examiner*—Ellis P. Robinson
*Attorney, Agent, or Firm*—Sughrue, Mion, Zinn, Macpeak & Seas

[57] ABSTRACT

A magnetic recording medium which comprises a non-magnetic support having thereon a magnetic recording layer containing ferromagnetic metal particles and a binder, wherein the ferromagnetic metal particles have a specfic area of about 35 to about 80 m$^2$/g, and the magnetic recording layer has a surface roughness of about 0.001 to 0.04 μm and a residual amount of the solvent is about 0.5 to about 30 mg/m$^2$.

26 Claims, No Drawings

MAGNETIC RECORDING MEDIUM

FIELD OF THE INVENTION

The present invention relates to a magnetic recording medium and more particularly to an improvement in a magnetic recording medium which is used for high density recording.

BACKGROUND OF THE INVENTION

Ferromagnetic particles include iron oxide type fine particles which are conventionally used and ferromagnetic metal particles which have recently been used to improve magnetic recording density as well as a reproduction output due to its high saturation magnetization and high coercive force as described in, for example, U.S. Pat. Nos. 4,054,530, 4,061,824 and 4,352,859.

Research and studies have been conducted on magnetic recording tape (a so-called "metal tape") prepared by using ferromagnetic metal particles to put the product into practical use for video recording, because a metal tape has higher recording density than a conventionally used iron oxide type recording tape. A system wherein a compact video tape recorder which uses a metal tape and which is associated with a video camera has been proposed. In comparison with the VHS system or the Beta system which have recently been used, this system is designed to have a higher recording density more than twice, about ½ the diameter of the head cylinder and about ½ the relative speed between the head and the tape. Accordingly, the recording wavelength in this system is half that of the VHS or Beta system and is assumed to have a wavelength of 1$\mu$ or less (about 0.6$\mu$).

This system must provide an image quality the same as or higher than that of the VHS system and the Beta system in recording and reproducing under those conditions. Therefore, if the image quality of this system is evaluated under the same conditions as that of the VHS system or the Beta system, a CN ratio (that is, the ratio of the output of reproduced signals/modulation noise on recording the FM carrying wave) of +6 dB or more higher than that of the VHS system of Beta system is required.

Various conditions must be met for the magnetic recording medium to have the above-described requirements, and naturally problems have occurred.

As the recording wavelength becomes shorter, the coercive force (Hc) of the tape must be increased to some extent. The surface of the magnetic recording layer must be made as smooth as possible to minimize spacing loss between the magnetic head and the magnetic recording layer.

The dispersibility of the ferromagnetic particles must be increased and a calendering treatment must be completely carried out to make the surface of the magnetic recording layer smooth. These are also effective to decrease noise. Further, it is very effective and important to decrease the particle size of the ferromagnetic particles.

However, if the particle size is decreased, the following problems arise. That is, the durability of a magnetic recording layer is decreased, head clogging easily occurs in a short period of time during use of the still image mode of the VTR, output is insufficient, and the surface of a magnetic recording layer is scraped away by the magnetic head.

Additionally, the thickness of the magnetic recording tape must be decreased as the video tape recorder becomes more compact, whereby curling easily occurs and the magnetic recording tape cannot therefore intimately contact the magnetic head. Thus satisfactory recording cannot be carried out.

SUMMARY OF THE INVENTION

A primary object of the present invention is to provide a magnetic recording medium having high video characteristics.

Another object of the present invention is to provide a magnetic recording medium having excellent durability.

A further object of the present invention is to provide a magnetic recording medium having reduced degree of curling.

The objects of the present invention are attained by a magnetic recording medium comprising a non-magnetic support having thereon a magnetic recording layer containing ferromagnetic metal particles and a binder, wherein the ferromagnetic metal particles have a specific surface area of about 35 m$^2$/g or more, and the magnetic recording layer has a surface roughness of about 0.04 $\mu$m or less and the residual amount of solvent in the magnetic recording layer is about 30 mg/m$^2$ or less.

DETAILED DESCRIPTION OF THE INVENTION

In the present invention, the thickness of the magnetic recording layer is usually about 0.5 to about 6 $\mu$m. The total thickness of the magnetic recording medium including the non-magnetic support is usually about 5 to about 50 $\mu$m.

It has been found that the specific surface area of ferromagnetic metal particles, which is determined by the BET N$_2$ gas adsorption method as described in *Kagaku Binran Oyo Hen* 2nd Ed. ed. by Japanese Chemical Society (1973) pp. 749–750, is an important factor to achieve this objects of the present invention. In order to accomplish the above-described objects, the specific surface area must be about 35 to about 80 m$^2$/g, and preferably 40 to 70 m$^2$/g. That is, by using ferromagnetic fine particles having a large specific surface area and having a smaller size, the surface of the magnetic recording layer can be made smooth, noise can be decreased and CN ratio can be increased.

Further, in order to minimize the spacing loss by narrowing the gap between the magnetic head and the magnetic recording tape, to decrease the noise and to increase the CN ratio, the surface roughness (Ra) of the magnetic recording layer must be about 0.001 to about 0.04 $\mu$m, and preferably 0.005 to 0.03 $\mu$m. The surface roughness (Ra) is determined by the center line average roughness in cut-off valve of 0.25 mm which is defined on page 5 of JIS-B0601.

The features of the present invention reside in the facts that not only the specific surface area of the ferromagnetic metal particles and the surface roughness of the magnetic recording layer are adjusted to a specific value, but also the residual amount of a solvent present in the magnetic recording layer is adjusted to a specific value.

It is, thus, preferred for the residual amount of solvent present in the magnetic recording layer to be about 0.5 to about 30 mg/m$^2$ and particularly 0.5 to 20 mg/m$^2$. The residual amount of solvents is determined by gas chromatography. This feature is effective when the total thickness of the magnetic recording layer is about 15 μm or less.

The method of preparing the ferromagnetic metal particles used in the present invention is not particularly limited. The ferromagnetic particles can be prepared, for example, by the following methods.

(1) A method which comprises heat-decomposing a salt of an organic acid of a ferromagnetic metal and reducing it with a reducing gas as described in U.S. Pat. Nos. 3,186,829 and 3,190,748.

(2) A method which comprises reducing an acicular oxyhydroxide, an acicular oxyhydroxide including another metal or an acicular iron oxide obtained from these oxyhydroxides (method for reducing an iron oxide) as described in U.S. Pat. Nos. 3,598,508 and 3,702,270.

(3) A method which comprises evaporating a ferromagnetic metal in an inert gas under low pressure (low vacuum evaporation method) as described in Tazaki et al.: *J. Appl. Phys.* 4, 707 (1965) and Tazaki et al.: *IEEE TRANS MAG*, 15, 1540 (1979).

(4) A method of heat-decomposing a metal carbonyl compound as described in U.S. Pat. Nos. 2,983,997 and 3,228,882.

(5) A method which comprises electrically depositing ferromagnetic metal particles on a mercury cathode and separating the mercury as described in U.S. Pat. Nos. 3,262,812 and 3,198,777.

(6) A method which comprises reducing an aqueous solution of a salt of metal which is capable of forming ferromagnetic particles with a reducing substance (e.g., hydroborate, hypophosphite or hydrazine) as described in U.S. Pat. Nos. 3,607,218 and 4,009,111.

In the present invention, ferromagnetic particle prepared in accordance with the above-described methods (2), (3) and (6) are most easily handled, and ferromagnetic particles prepared in accordance with method (2) is the most preferred because of low cost and high quality. In this method, the particle size (or specific surface area) of ferromagnetic particles obtained depends on the particle size (or specific surface area) of starting materials, e.g., acicular oxyhydroxides or a mixture of oxyhydroxides and other metals, and it is necessary to choose starting materials having an appropriate particle size (or specific surface area) so that products having a predetermined particle size (or specific surface area) can be obtained. In preparing the ferromagnetic metal particles used in the present invention, it is desirable for an oxidized layer to be present on the surface of the particles to improve the chemical stability of the fine metal particles. The oxidized layer can be prepared using conventional techniques as described in, for example, Japanese Patent Application (OPI) Nos. 85054/77 and 21143/80. Usually, the thickness of the oxidized layer is about 20 Å to about 100 Å.

The ferromagnetic metal particles can be pure iron or an iron alloy such as Fe-Ni or Fe-Ni-Co. which can include a small amount of a non-metallic or non-magnetic element such as B, C, N, Al, Si, P, S, Ti, Cr, Mn, Cu or Zn to improve characteristics, if desired. Usually, the amount of the non-metallic or non-magnetic element is about 0.1 to about 15% by weight, preferably 3 to 12% by weight and more preferably 4 to 10% by weight based on the total weight of the ferromagnetic metal particles. The particle shape can be any form, for example, a chain form which is composed of spherical particles having a diameter of several hundreds angstroms or a skeleton of acicular particles. Therefore, the particle size is not limited.

The saturation magnetization of magnetic particles is about 120 to about 180 emu/g, preferably 125 to 180 emu/g. The residual magnetization (Br) of the magnetic recording layer and video sensitivity can be increased by using magnetic particles having high saturation magnetization.

The coercive force (Hc) of magnetic recording medium is about 1,000 to about 2,500 Oe, preferably 1,100 to 2,200 Oe, and more preferably 1,200 to 2,200 Oe. Various loss (e.g., self-demagnetization, recording demagnetization) arising on using a shorter recording wave-length can be reduced by increasing the coercive force to a value not lower than about 1,000 Oe, whereby a magnetic recording medium providing high output can be obtained.

In order to decrease the surface roughness (Ra) by smoothing the surface of the magnetic recording layer, the particle size of the ferromagnetic particles should be decreased, the ferromagnetic particles and a binder should be sufficiently mixed, kneaded and dispersed, and a smoothing treatment for the magnetic recording layer, such as supercalendering treatment, should be employed. Usually, the mixing, kneading and dispersing can be carried out using a horizontal ball mill or a grain mill until the ferromagnetic particles are dispersed satisfactorily, e.g., for about 20 hours. The smoothing of the magnetic recording layer can be effected by passing the non-magnetic support having thereon a magnetic recording layer between a metal roll and a resilient roll and hot pressing it at a temperature of about 40° to 110° C.

Suitable organic solvents which can be used for coating the magnetic composition include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate, glycol acetate or monoethyl ether; ethers such as diethyl ether, glycol monoethyl ether, glycol dimethyl ether or dioxane; aromatic hydrocarbons such as benzene, toluene or xylene; chlorinated hydrocarbons such as methylene chloride, ethylene chloride, carbon tetrachloride, chloroform, ethylene chlorohydrin or dichlorobenzene, these solvents can be used alone or in combination.

Particularly, methyl ethyl ketone, methyl isobutyl ketone, cyclohexanone, butyl acetate, toluene and xylene are preferred because they are easily handled.

In order to improve the video characteristics, which is an object of the present invention, the particle size of the ferromagnetic metal fine particles used in the present invention is small, i.e., the specific surface area is large and that the surface roughness (Ra) of the magnetic recording layer is small.

However, on the contrary, the durability of the magnetic recording layer decreases as the particle size decreases. An effective method to solve the above problem is to reduce the amount of the solvent remaining in the magnetic recording layer to a small amount. When the tape has a total thickness of about 15μ or less, curling easily occurs, which can be prevented by adjusting the residual amount of the solvent to a small amount.

Iron oxide type tapes which have conventionally been used for VHS and Beta system have larger magnetic particles, high surface roughness, and accordingly have much higher durability than metal tapes. Iron oxide type tapes have less curling than metal tapes when the same amount of the solvent is used.

The above-described ferromagnetic particles are mixed and kneaded with a binder to prepare a magnetic coating composition. Suitable binders which can be used in the present invention is not limited and include which are conventional thermosetting thermoplastic, reactive type resins and mixtures thereof. Specific binders include, for example, vinyl chloride-vinyl acetate copolymers, various cellulose resins, acryl type resins, polyamide type resins, butadiene type resins, urethane elastomers, and isocyanate curable type resins as described in, for example, U.S. Pat. Nos. 3,144,353 and 3,781,211. Of these, vinyl chloride-vinyl acetate copolymers, cellulose resins, urethane elastomers and isocyanate curable type resins are preferred.

The amount of the binder is about 5 to about 35 parts by weight, preferably 8 to 25 parts by weight, per 100 parts by weight of ferromagnetic particles.

Various fatty acids and fatty acid esters can be present in the magnetic recording layer to reduce the abrasion coefficient of the magnetic recording layer with the VTR guide parts, the head cylinder and cassette parts and to improve the running properties. Suitable lubricants such as silicone oil (e.g., polysiloxane), inorganic particles, e.g., graphite or molybdenum disulfide, synthetic resin fine particles, e.g., polyethylene or polytetrafluoroethylene, fluorocarbons, abrasives such as fused alumina, carbon silicate, chromium oxide ($Cr_2O_3$), corundum or diamond, the mixture thereof, if desired, surfactants, plasticizers, antioxidants and the mixtures thereof can be also present in the magnetic recording layer, if desired.

Suitable non-magnetic supports include synthetic resins (e.g., polyesters, such as polyethylene terephthalate, vinyl type polymers, cellulose derivatives), non-magnetic metals, and papers. A preferred non-magnetic support is polyethylene terephthalate. The supports can be in the form of a film, a tape or a sheet.

The magnetic recording layer coated on the support is subjected to a smoothing treatment before drying or a calendering treatment after drying to improve the magnetic characteristics such as S/N.

The additives, supports and the methods for preparing the magnetic recording tapes as illustrated above are disclosed in Japanese Patent Publication (examined) No. 26890/81.

The present invention is illustrated in greater detail by the following example. All parts are by weight herein unless otherwise indicated.

EXAMPLE $\alpha$-$Fe_2O_3$ which had been prepared by heat-decomposing an acicular $\alpha$-FeOOH having a cobalt content of 5% at 300° to 800° C. was reduced with hydrogen to obtain black ferromagnetic metal particles. A gradual oxidation treatment was provided to the particles by gradually increasing the oxygen partial pressure in the furnace before the particles were removed from the furance. That is, oxidation was carried out with an initial $O_2/N_2$ volume ratio of 1/100 followed by a ratio of 1/10 and finally a ratio of 1/0. The magnetic characteristics and the specific surface area of the resulting magnetic particles are shown in Table 1 below.

TABLE 1

| Ferromagnetic Metal Particle | Specific Surface Area ($m^2/g$) | Hc (Oe) | δs (emu/g) |
|---|---|---|---|
| A | 28 | 1,200 | 132 |
| B | 30 | 1,430 | 141 |
| C | 38 | 1,150 | 135 |
| D | 43 | 1,580 | 144 |
| E | 45 | 1,460 | 136 |
| F | 46 | 1,480 | 128 |
| G | 53 | 1,560 | 133 |
| H | 55 | 1,500 | 125 |

300 parts of the resulting ferromagnetic metal particles and the following composition were mixed, kneaded and dispersed in a ball mill for the periods of time as shown in Table 2 below.

| | Parts |
|---|---|
| Polyester Polyurethane (reaction product of ethylene adipate and 2,4-tolylene diisocyanate, average molecular weight equivalent to styrene, about 130,000) | 35 |
| Copolymer of Vinyl Chloride-Vinyl Acetate-Maleic Anhydride (90:7:3, degree of polymerization: about 400) | 30 |
| α-Alumina | 15 |
| Carbon Black | 3 |
| Butyl Acetate | 200 |
| Methyl Ethyl Ketone | 100 |
| Cyclohexanone | 300 |

After dispersion, fatty acids (3 parts of oleic acid and 3 parts of palmitic acid) and a fatty acid ester (4 parts of amyl stearate) were added to each of the dispersions an then the mixtures were mixed and kneaded for 15 to 30 minutes. To each dispersion was added 22 parts of a 75 wt% ethyl acetate solution of a triisocyanate (adduct of 3 moles of tolylene diisocyanate and 1 mole of trimethylolpropane: molecular weight: about 760, NCO content: 13.3%, trade name "Desmodur L-75" manufactured by Bayer A.G.). The mixture was dispersed for 1 hour with a high speed shearing force to prepare a magnetic coating composition. The resulting coating composition was then coated on a polyethylene terephthalate film having a thickness of 14.5μ in a dry thickness of 3.0μ.

The coated layer was subjected to an orientation treatment in a direct magnetic field and was then dried at the temperature as shown in Table 2. After drying, the layer was subjected to a calendering treatment and slit into a width of ½ inch to prepare a magnetic recording tape for video tape recording. The final thickness thereof was 3.4μ.

The magnetic characteristics obtain are shown by the values measured using a sample-oscillating type magnetic flux meter, available under the trade name of "VSM-III type" manufactured by Toei Kogyo Co., Ltd.

The video characteristcs were determined by measuring the reproduced output at 4 MHz using a VHS system VTR. The magnetic head for recording and reproducing of the VTR was made of a sendust alloy, available under the trade name "NV-8800" manufactured by Matsushita Electric Industries, Co., Ltd. The standard tape was a VHS tape, available under the trade name "T-120 E" manufactured by Fuji Photo Film Co., Ltd.

The surface roughness is shown by center line average roughness at a cut off of 0.25 mm, as defined on page 5 of JIS-B0601.

The durability of the magnetic recording layer was determined by allowing the above-described VTR to stand at a temperature of 30° C. and 80% relative humidity, and running the tape to measure the time that the output of the tape decreased by 1 dB. (The upper time limit was 60 minutes.)

The residual amount of the solvent in the magnetic recording layer was measured with a gas chromatograph, available under the trade name "GC-5A" manufactured by Shimazu Seisakusho, using a filler available under the trade name "Chromosorb 101" manufactured by Johns Manville Co., Ltd., the length of the column was 1 meter, the temperature of the bath for the column was 180° C., helium was used as a carrier gas and the rate of feeding the carrier gas was 50 m/min. The tape having the width of ½ inch was put into a sample collecting tube and was heated at 150° C.

The degree of curling was determined by cutting a tape having a width of ½ inch and a length of 3 mm in the direction of production to measure the degree of curving thereof, where the tape curled in the traverse direction with a magnetic recording layer curving inward. The tape was vertically cut and the cross-sectional curling thereof was assumed to be an arc, from which the circular radius thereof was calculated. If the radius was 20 mm or more, the curling can be ignored from a practical point of view.

cellent (comparison between sample tapes No. 12 and Nos. 13 and 14). The residual amount of the solvent does not affect the characteristics of iron oxide type particles (see sample tape No. 15).

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic recording layer comprising ferromagnetic metal particles and a binder, wherein the ferromagnetic metal particles have a specific surface area of about 35 to about 80 $m^2/g$, and the magnetic recording layer has a surface roughness of about 0.001 to about 0.04 $\mu m$ and the residual amount of solvent in the magnetic recording layer is about 0.5 to about 30 $mg/m^2$.

2. The magnetic recording medium as claimed in claim 1, wherein the ferromagnetic metal particles have a specific surface area of 40 to 70 $m^2/g$.

3. The magnetic recording medium as claimed in claim 1, wherein the magnetic recording layer has a surface roughness of 0.005 to 0.03 $\mu m$.

4. The magnetic recording medium as claimed in claim 1, wherein the residual amount of solvent is 0.5 to 20 $mg/m^2$.

5. The magnetic recording medium as claimed in claim 1, wherein the ferromagnetic metal particles are composed of pure iron or an iron alloy.

TABLE 2

| No. | Ferromagnetic Fine Particle | Time for mixing Kneading & Dispersing (hr) | Drying Temp. (°C.) | Residual Amount of Solvent (mg/m²) | Hc (Oe) | Bm (Gauss) | Squareness Ratio | Surface Roughness (μm) | Video output at 4 MHz (dB) | CN Ratio (dB) | Durability (min.) | Curling (mm) | Remarks |
|---|---|---|---|---|---|---|---|---|---|---|---|---|---|
| 1 | A | 12 | 100 | 13 | 1080 | 2900 | 0.78 | 0.042 | +8.0 | +5.5 | >60 | 25 | Comparative Ex. |
| 2 | B | " | " | 12 | 1305 | 3200 | 0.76 | 0.038 | +9.0 | +6.0 | " | " | Comparative Ex. |
| 3 | C | " | " | 15 | 1020 | 3010 | 0.77 | 0.035 | +8.5 | +7.0 | " | " | Example |
| 4 | D | " | " | 10 | 1490 | 3120 | 0.74 | 0.028 | +9.0 | +8.0 | " | " | " |
| 5 | E | " | " | 14 | 1380 | 3000 | 0.75 | 0.030 | +9.5 | " | " | " | " |
| 6 | F | " | " | 13 | 1340 | 2850 | 0.76 | 0.030 | +8.0 | +7.0 | " | " | " |
| 7 | G | " | " | 12 | 1470 | 3300 | 0.77 | 0.028 | +9.0 | +8.0 | " | " | " |
| 8 | H | " | " | 13 | 1420 | 3250 | 0.76 | 0.030 | +8.0 | +7.0 | " | " | " |
| 9 | D | 10 | " | 16 | 1480 | 3150 | 0.75 | 0.035 | " | +6.5 | " | " | " |
| 10 | " | 8 | " | 15 | 1490 | 3050 | 0.73 | 0.045 | +7.0 | +5.5 | " | " | Comparative Ex. |
| 11 | " | 6 | " | " | 1500 | 3100 | 0.72 | 0.055 | +5.5 | +4.0 | " | " | Comparative Ex. |
| 12 | E | 12 | 95 | 27 | 1390 | 3080 | 0.75 | 0.028 | +9.0 | +8.0 | 53 | 23 | Example |
| 13 | " | " | " | 38 | 1380 | 2950 | 0.76 | 0.029 | " | " | 35 | 13 | Comparative Ex. |
| 14 | " | " | " | 50 | " | 3050 | " | 0.028 | +9.5 | +7.5*¹ | 21 | 7 | Comparative Ex. |
| 15 | *² | " | 100 | 35 | 685 | 1550 | 0.81 | 0.038 | +1.0 | +0.5 | >60 | 22 | " |
| 16 | *³ | " | " | 18 | 1430 | 3430 | 0.73 | 0.022 | +9.5 | +8.5 | 55 | 24 | Example*⁴ |

Note:
*¹Unstable output
*²Co-modified iron oxide
*³Ferromagnetic metal particle prepared by the low vacuum evaporation method
*⁴Specific surface area: 52 m²/gr; Hc: 1,5500e; σs: 140 emu/gr; Fe/Co: 80/20 (weight ratio)

It is apparent from the results in Table 2 that when the specific surface area of the ferromagnetic particle is 35 $m^2/g$ or more, the CN ratio exceeds 6 dB and is satisfactory (comparison between sample tapes Nos. 1 and 2 and Nos. 3 to 8), that when the surface roughness (Ra) of the magnetic recording layer is 0.04 $\mu m$ or less, the video output and the CN ratio increases (comparison between sample tapes No. 9 and Nos. 10 and 11) and that when the residual amount of the solvent is 30 $mg/m^2$ or less, durability and curling property are ex- 6. The magnetic recording medium as claimed in claim 5, wherein the ferromagnetic metal particles are selected from the group consisting of Fe, Fe-Ni and Fe-Ni-Co.

7. The magnetic recording medium as claimed in claim 6, wherein the ferromagnetic metal particle contain a non-magnetic metal element or a non-metallic element.

8. The magnetic recording medium as claimed in claim 7, wherein the non-magnetic metal element is selected from the group consisting of Al, Ti, Cr, Mn, Cu and Zn.

9. The magnetic recording medium as claimed in claim 7, wherein the non-metallic element is selected from the group consisting of B, C, N, Si, P and S.

10. The magnetic recording medium as claimed in claim 7, wherein the amount of the non-metallic element or non-magnetic metal element is 0.1 to 15% by weight based on the total weight of the ferromagnetic metal particles.

11. The magnetic recording medium as claimed in claim 10, wherein the amount of the non-metallic element or non-magnetic metal element is 3 to 12% by weight based on the total weight of the ferromagnetic metal particles.

12. The magnetic recording medium as claimed in claim 11, wherein the amount of the non-metallic element or non-magnetic metal element is 4 to 10% by weight based on the total weight of the ferromagnetic metal particles.

13. The magnetic recording medium as claimed in claim 1, wherein the ferromagnetic metal particles have an oxidized layer with a thickness of about 20 Å to about 100 Å.

14. The magnetic recording medium as claimed in claim 1, wherein the magnetic recording layer has a saturation magnetization of about 120 to about 180 emu/g.

15. The magnetic recording medium as claimed in claim 14, wherein the magnetic recording layer has a saturation magnetization of 125 to 180 emu/g.

16. The magnetic recording medium as claimed in claim 1, wherein the binder is selected from the group consisting of a thermosetting resin, a thermoplastic resin, a reactive type resin and mixtures thereof.

17. The magnetic recording medium as claimed in claim 16, wherein the binder is selected from the group consisting of a vinyl chloride-vinyl acetate copolymer, a cellulose resin, an acryl resin, a polyamide type resin, a butadiene type resin, a urethane elastomer and an isocyanate curable resin.

18. The magnetic recording medium as claimed in claim 17, wherein the binder is selected from the group consisting of a vinyl chloride-vinyl acetate copolymer, a cellulose resin, a urethane elastomer and an isocyanate curable resin.

19. The magnetic recording medium as claimed in claim 1, wherein the amount of the binder is about 8 to about 25 parts by weight per 100 parts by weight of the ferromagnetic metal particles.

20. The magnetic recording medium as claimed in claim 1, wherein the magnetic recording layer additionally contains a fatty acid or a fatty acid ester.

21. The magnetic recording medium as claimed in claim 1, wherein the magnetic recording layer additionally contains at least one additive selected from the group consisting of a lubricant, an abrasive, a surfactant, a plasticizer and an antioxidant.

22. The magnetic recording medium as claimed in claim 21, wherein the lubricant is selected from the group consisting of a silicone oil, graphite, molybdenum disulfide, polyethylene, polytetrafluoroethylene and a fluorocarbon.

23. The magnetic recording medium as claimed in claim 21, wherein the abrasive is selected from the group consisting of fused alumina, silicon carbide, chromium oxide, corundum and diamond.

24. The magnetic recording medium as claimed in claim 1, wherein the non-magnetic support is a support of a synthetic resin, a non-magnetic metal or paper.

25. The magnetic recording medium as claimed in claim 24, wherein the synthetic resin is selected from the group consisting of a polyester, a vinyl polymer and a cellulose derivative.

26. The magnetic recording medium as claimed in claim 25, wherein the polyester is polyethylene terephthalate.

* * * * *